(12) United States Patent
Cameron et al.

(10) Patent No.: US 10,053,343 B1
(45) Date of Patent: Aug. 21, 2018

(54) TRUCK BED SCISSOR LIFT

(71) Applicants: Rodney Cameron, Aldergrove (CA); Robert Kuhn, Aldergrove (CA); Herman Martin, Surrey (CA)

(72) Inventors: Rodney Cameron, Aldergrove (CA); Robert Kuhn, Aldergrove (CA); Herman Martin, Surrey (CA)

( * ) Notice: Subject to any disclaimer, the term of this patent is extended or adjusted under 35 U.S.C. 154(b) by 0 days.

(21) Appl. No.: 15/426,920

(22) Filed: Feb. 7, 2017

(51) Int. Cl.
*B66F 7/06* (2006.01)
*B66F 7/08* (2006.01)
*B60P 3/12* (2006.01)
*B60P 3/08* (2006.01)

(52) U.S. Cl.
CPC ............. *B66F 7/065* (2013.01); *B60P 3/08* (2013.01); *B60P 3/122* (2013.01); *B66F 7/0608* (2013.01); *B66F 7/0633* (2013.01)

(58) Field of Classification Search
CPC .......... B66F 7/065; B66F 7/08; B66F 7/0625; B66F 11/042; B60P 1/02; B60P 3/08; B64F 1/32; B65G 69/24
See application file for complete search history.

(56) References Cited

U.S. PATENT DOCUMENTS

| | | | | |
|---|---|---|---|---|
| 2,797,833 A | * | 7/1957 | Cash, Jr. | B60P 1/02 182/13 |
| 2,862,689 A | * | 12/1958 | Dalrymple | B66F 7/065 187/269 |
| 2,899,172 A | * | 8/1959 | Cresci | B60P 1/02 254/122 |
| 3,032,319 A | * | 5/1962 | Dale | B65H 31/18 182/158 |
| 3,246,876 A | * | 4/1966 | Larson | B66F 7/065 187/269 |
| 3,991,857 A | * | 11/1976 | Wolk | B66F 7/065 187/269 |
| 4,221,280 A | * | 9/1980 | Richards | B66F 7/065 187/269 |
| 4,221,420 A | * | 9/1980 | Vencill | B60P 3/08 254/122 |
| 4,824,162 A | | 4/1989 | Geisler | |
| 4,899,987 A | * | 2/1990 | Craig | B66F 7/065 254/122 |
| 4,923,357 A | * | 5/1990 | Isogai | B65G 69/24 14/71.3 |
| 4,979,592 A | * | 12/1990 | Isogai | B65G 69/24 187/217 |
| 5,054,578 A | * | 10/1991 | Smillie, III | B60R 5/04 182/141 |
| 5,102,185 A | | 4/1992 | Lake | |

(Continued)

*Primary Examiner* — Gregory W Adams
(74) *Attorney, Agent, or Firm* — Richard D. Okimaw (57) ABSTRACT

An apparatus for transporting cargo within the box of a truck comprises a central platform, extending between first and second sides, the central platform sized to be located between wheel wells of a box of a truck, a lift, operable to move the central platform between a first position parallel to and proximate to a bottom horizontal surface of a bed of the box of the truck and a second position parallel to and vertically spaced above the first position, and first and second platform extensions, each of the first and second platform extensions operably engageable with the first or second side of the central platform so as to form a continuous planar surface therewith at the second position.

8 Claims, 6 Drawing Sheets

(56) References Cited

U.S. PATENT DOCUMENTS

| | | | | |
|---|---|---|---|---|
| 5,297,653 | A * | 3/1994 | Wurtz | B66F 11/042 |
| | | | | 182/141 |
| 5,588,377 | A * | 12/1996 | Fahmian | A47B 9/00 |
| | | | | 108/145 |
| 5,630,694 | A * | 5/1997 | Ihara | B64F 1/32 |
| | | | | 244/137.1 |
| 5,765,987 | A * | 6/1998 | Zimmermann | B60R 5/04 |
| | | | | 414/462 |
| 6,467,830 | B1 | 10/2002 | Cortright | |
| 6,571,913 | B2 * | 6/2003 | Puszkiewicz | B66F 9/06 |
| | | | | 182/69.1 |
| 6,616,210 | B1 | 9/2003 | Massey | |
| 6,663,167 | B2 | 12/2003 | Phillips et al. | |
| 6,929,303 | B1 | 8/2005 | Sharples | |
| 7,140,820 | B2 * | 11/2006 | Chang | B60P 3/08 |
| | | | | 410/24.1 |
| 7,413,056 | B2 * | 8/2008 | Gonzi | B66F 7/065 |
| | | | | 187/269 |
| 7,481,502 | B2 * | 1/2009 | Ortiz | A47B 1/04 |
| | | | | 108/79 |
| 7,552,683 | B2 * | 6/2009 | Hayashi | B62D 65/18 |
| | | | | 104/89 |
| 7,658,273 | B2 * | 2/2010 | Nakamura | B65G 17/48 |
| | | | | 104/34 |
| 8,056,701 | B2 * | 11/2011 | Sugimoto | B65G 35/06 |
| | | | | 187/211 |
| 8,162,190 | B2 | 4/2012 | Hanson | |
| 8,353,661 | B2 | 1/2013 | Morasse | |
| 8,888,070 | B2 * | 11/2014 | Olesen | A61G 5/1059 |
| | | | | 187/211 |
| 9,079,548 | B1 | 7/2015 | Singer | |
| 2006/0072994 | A1 * | 4/2006 | Noding | B60P 3/40 |
| | | | | 414/462 |
| 2010/0012907 | A1 * | 1/2010 | Lee | B66F 7/065 |
| | | | | 254/131 |
| 2013/0256611 | A1 * | 10/2013 | Ruth Sen | B66F 7/065 |
| | | | | 254/122 |
| 2014/0117697 | A1 | 5/2014 | Danhoff | |

* cited by examiner

TRUCK BED SCISSOR LIFT

BACKGROUND OF THE INVENTION

1. Field of Invention

The present invention relates generally to pickup truck cargo beds and in particular to an apparatus adapted to raise a support for a storage platform from the truck bed, allowing for additional cargo space, including oversized items.

2. Description of Related Art

Pickup trucks are popular vehicles in part due to the versatility of the truck bed. A variety of cargo items may be carried within the open truck bed, or a cover may be added to protect the items within the bed. Various custom inserts may also be added to the bed, including storage boxes or elevated platforms.

It is common for users to want to carry multiple items at once, including oversized items. Some oversized items, such as recreational vehicles may be wider than the space available between the wheel wells or truck bed side rails.

A disadvantage of the pickup truck bed is the cargo space limit defined by the floor area of the bed. Solutions have been provided which allow for the ability to add a second level of storage space above the truck bed. Applicant is aware of decks for mounting above the box of a truck which provide an enlarged surface on which to locate items. Such devices, however are commonly quite heavy to lift on to the truck and permanently increase the width of the truck which may not be desirable.

SUMMARY OF THE INVENTION

According to a first embodiment of the present invention there is disclosed an apparatus for transporting cargo within the box of a truck, the apparatus comprising a central platform, extending between first and second sides, the central platform sized to be located between wheel wells of a box of a truck, a lift, operable to move the central platform between a first position parallel to and proximate to a bottom horizontal surface of a bed of the box of the truck and a second position parallel to and vertically spaced above the first position, and first and second platform extensions, each of the first and second platform extensions operably engageable with the first or second side of the central platform so as to form a continuous planar surface therewith at the second position.

Each of the first and second platform extensions may include at least one support arm extending perpendicularly therefrom, the at least one support arm sized to be received within a corresponding mounting hole within the first or second side of the central platform. The at least one support arm may comprise two support arms.

The first and second platform extensions may include at least one vertical support, rotatably supported from a bottom of the first and second platform extensions into engagement with the bed of the truck. The apparatus may further comprise at least one mounting block secured to the bed of the truck.

The lift may comprise a scissor lift having first and second crossed interlinked scissor members located adjacent to each of the first and second sides of the central platform. The first and second crossed interlinked scissor members may be connected with a shaft, extending between the first and second crossed interlinked scissor members and rotatably secured to the first and second crossed interlinked scissor members, rotatable about a shaft axis. The shaft may include at least one lift arm mounted on the shaft, operable to extend the first and second crossed interlinked scissor members. The at least one lift arm may include a wheel at a distal end thereof. The wheel may engage upon a track proximate to the bed of the truck.

The lift may include an actuator, operable to rotate the at least one lift arm about the shaft axis. The lift may include a crank arm. The actuator may comprise a threaded rod extending between a rear cross member of the lift and a threaded body, the threaded body secured to the crank arm, rotatable about a threaded body axis and operable to engage with the threaded shaft.

According to a further embodiment of the present invention there is disclosed a method for transporting cargo within a truck comprising providing a central platform, extending between first and second sides, the central platform sized to be located between wheel wells of a box of a truck, providing a lift, operable to move the central platform between a first position parallel to and proximate to a bottom horizontal surface of a bed of the box of the truck and a second position parallel to and vertically spaced above the first position, and providing first and second platform extensions, each of the first and second platform extensions operably engageable with the first or second side of the central platform so as to form a continuous planar surface therewith at the second position. The method further comprises actuating the lift with a torque device, raising the central platform to the second position, engaging the first and second platform extensions with the central platform, forming the continuous planar surface therewith. The method further comprises rotating a vertical support from each of the first and second platform extensions and engaging the vertical supports with corresponding mounting blocks, the mounting blocks secured to the bed of the truck, and positioning cargo on the continuous planar surface.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
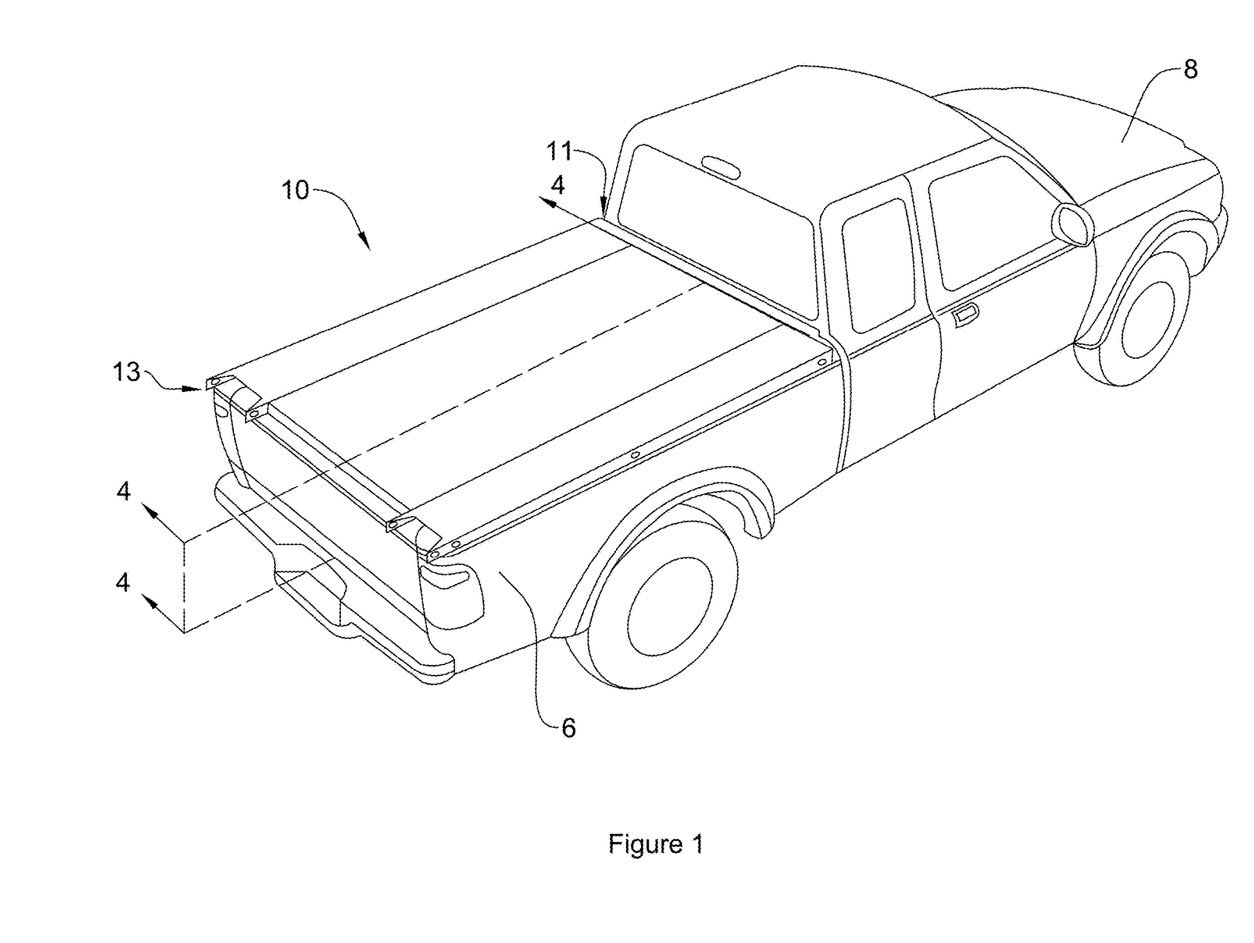
FIG. 1 is a perspective view of a pickup truck having an apparatus which provides an elevated, extended width platform according to a first embodiment of the present invention in a bed thereof.

Referring to FIG. 1, an apparatus for transporting cargo according to a first embodiment of the invention is shown generally at 10, located within the box 6 of a pickup truck 8. The apparatus 10 may be used to support and carry a wide variety of cargo items, such as, by way of non-limiting example, all-terrain vehicles, snowmobiles, equipment and building materials.

Figure 2:
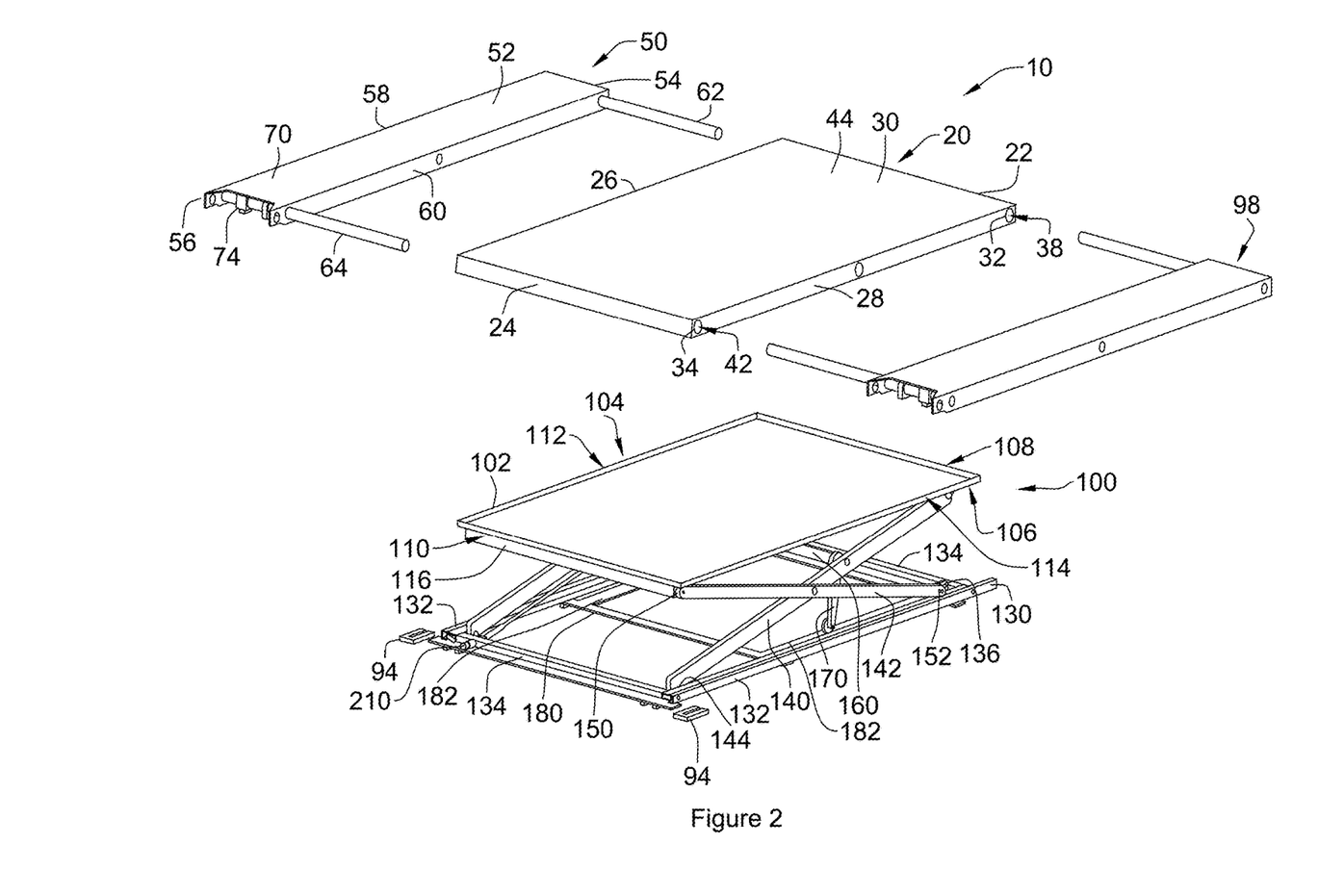
FIG. 2 is an exploded perspective view of the apparatus of FIG. 1.

Turning to FIG. 2, an exploded perspective view of the apparatus 10 is illustrated. The apparatus 10 comprises a central platform 20, supported by a lift 100, with first and second platform extensions, 50 and 98, respectively, which may be engaged upon the central platform 20, as will be set out in more detail below. The lift 100 is operable to move between a first lowered position and a second raised position, as will be described below. The apparatus 10 is illustrated in the second raised position in FIGS. 1 and 2.

Figure 3:
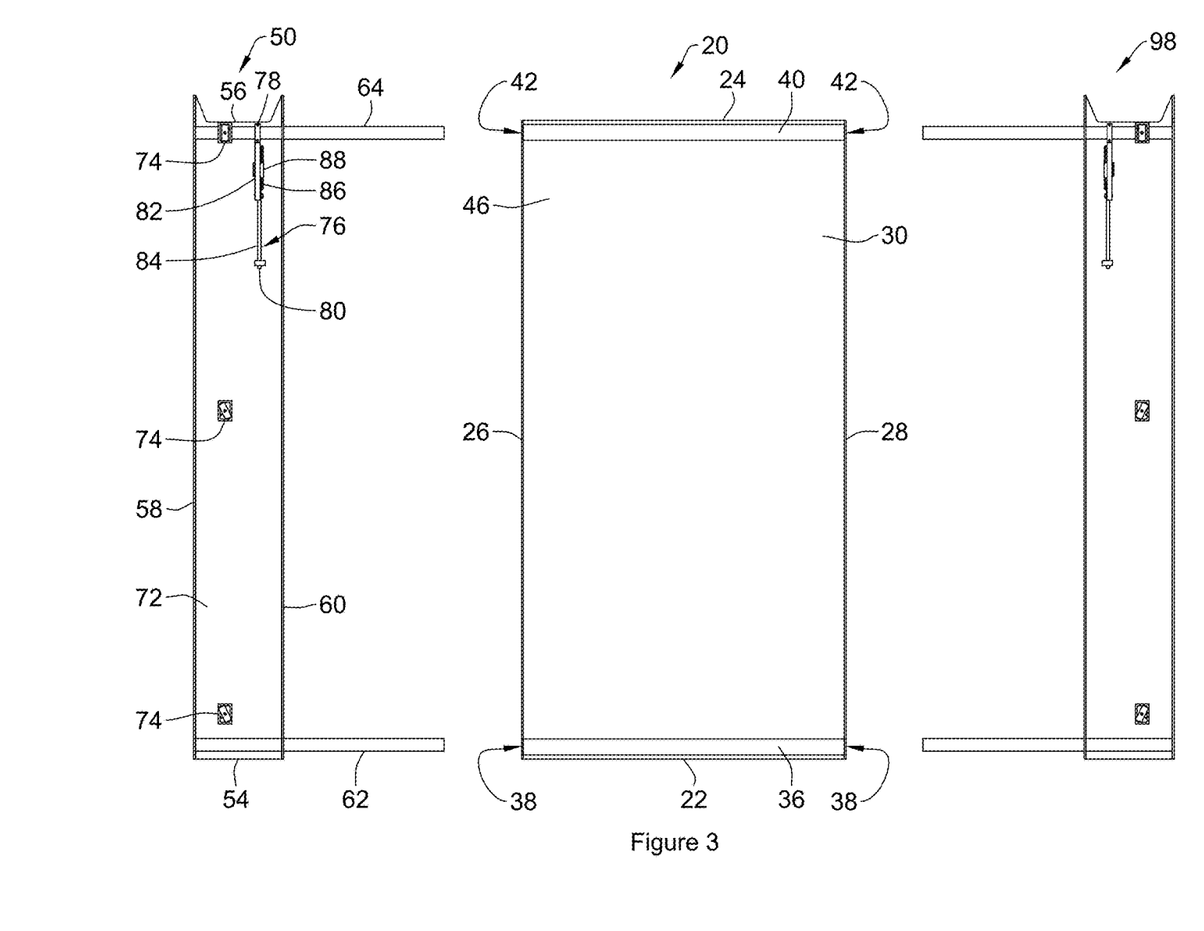
FIG. 3 is a bottom view of the central platform and platform extensions of the apparatus of FIG. 1.

Referring to FIGS. 2 and 3, the central platform 20, having a top and a bottom, 44 and 46, respectively, includes a horizontal rigid planar member 30, having a rectangular outline and extending between front and rear ends, 22 and 24, respectively and between first and second sides, 26 and 28, respectively. The rigid planar member 30 is sized to be received within the box 6 of a truck 8 between wheel arches, as are commonly known, with the front end 22 positioned proximate to the front 11 of the box 6 and the rear end 24 positioned proximate to the rear 13 of the box 6. Each end and side, 22, 24, 26 and 28, extends perpendicularly from the perimeter edges of the rigid planar member 30 towards the bottom 46 and may be constructed of metal members such as L-channels, c-channels or the like. It will be appreciated that the ends and sides 22, 24, 26 and 28 may be co-formed with the rigid planar member 30 and bent into position, as is commonly known. The first and second sides, 26 and 28, include front and rear mounting holes, 32 and 34, respectively, therethrough, the purpose of which will be set out below. The front mounting holes 32, are located proximate to the front end 22, and the rear mounting holes 34 are located proximate to the rear end 24. It will be appreciated that additional mounting holes may be included, as well. As best seen on FIG. 3, a front elongate tubular member 36 is aligned with and extends between the front mounting holes 32 proximate to the bottom 46 of the central platform 20, with a passage 38 therethrough and a rear elongate tubular member 40 is aligned with and extends between the rear mounting holes 34 proximate to the bottom 46 of the central platform 20, with a passage 42 therethrough. The purpose of the passages 38 and 42 will be set out below. The front and rear elongate tubular members 36 and 40 may be secured to the central platform 20 by any known means, such as, by way of non-limiting example, welding or support brackets attached with fasteners, as is commonly known.

The first platform extension 50, having a top and a bottom, 70 and 72, respectively, comprises an elongate horizontal rigid planar member 52 extending between front and rear edges, 54 and 56, respectively, and between first and second sides, 58 and 60, respectively, with front and rear support arms, 62 and 64, respectively, extending perpendicularly from the second side 60 thereof, at locations corresponding with the front and rear mounting holes, 32 and 34, on the central platform 20. The first and second sides, 58 and 60, extend perpendicularly from the rigid planar member 52 towards the bottom 72 and may be constructed of metal members such as L-channels, c-channels or the like, or they may be co-formed with the rigid planar member 52 and bent into position, as is commonly known. The rear edge 56 may have any edge profile, as is commonly known.

Each support arm, 62 and 64, comprises an elongate rigid member sized to be received through the front and rear mounting holes, 32 and 34, respectively, and into the corresponding passages 38 and 42 on the bottom 46 of the central platform 20. As illustrated in FIG. 3, each support arm, 62 and 64, may extend from the first side 58 and through the second side 60, extending a distance beyond the second side 60 up to half the length of the corresponding tubular member, 36 or 40. When the front and rear support arms 62 and 64 are fully engaged within the passages 38 and 42, the second side 60 of the first platform extension 50 engages upon first side 26 of the of the central platform 20, such that the rigid planar members 30 and 52 form a continuous horizontal surface thereon.

Referring to FIG. 3, a plurality of locking blocks 74 may be secured to the bottom 72 of the first platform extension 50. The locking blocks 74 are sized and spaced therealong to correspond with associated stake pockets on the rail of the box 6 of the pickup truck 8, as are commonly known. The locking blocks 74 are adapted to be received within and secured in locking engagement within the stake pockets, as is commonly known.

Figure 5:
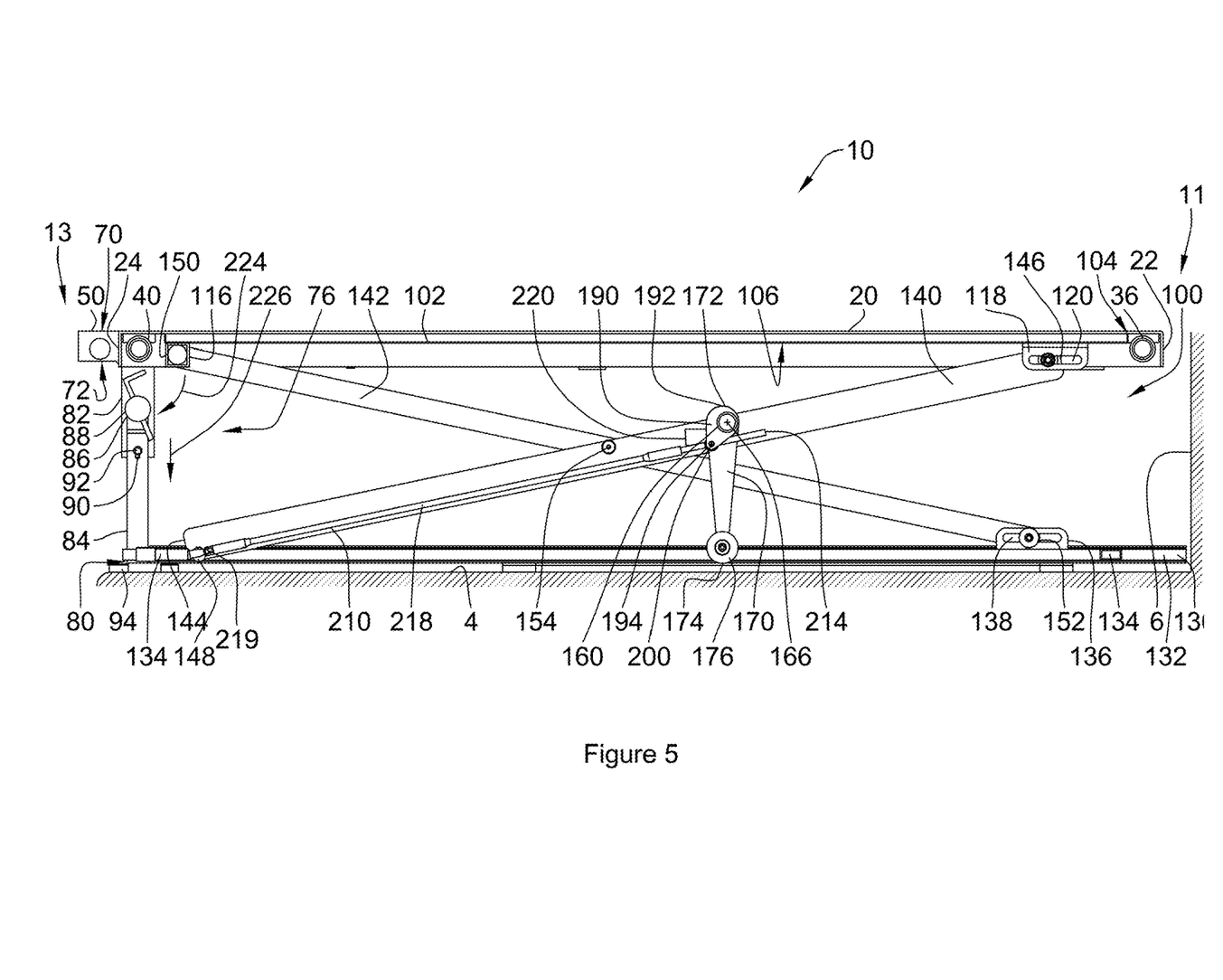
FIG. 5 is a side cross-sectional view of the apparatus of FIG. 1 at a second or raised position as taken along plane 4-4.

As seen in FIGS. 3 and 5, the first platform extension 50 includes a rotatable vertical support 76, rotatably secured to the bottom 72 proximate to the rear edge 56 thereof. The rotatable vertical support 76 extends between first and second ends, 78 and 80, respectively, and is comprised of a rotatable portion 82 extending from the first end 78 and an extending portion 84 extending from the second end 80. The extending portion 84 extends between a first end 86 and the second end 80 with a clamp 88, as is commonly known, extending through the rotatable portion 82 securing the first end 86 to the rotatable portion 82. A slot 90 extends through the extending portion 84 and slot pin 92 is secured to the rotatable portion 82 and extends through the slot 90, maintaining alignment between the rotatable portion 82 and the extending portion 84 when the clamp 88 is released, allowing the extending portion 84 to extend and retract, as is commonly known. When fully extended and rotated into the vertical position, as shown in FIG. 5, the second end 80 of the rotatable vertical support 76 engages within a mounting block 94, securable to the bed 4 within the box 6 of the pickup truck 8. The second platform extension 98 is formed as a mirror of the first platform extension 50, as illustrated in FIGS. 2 and 3.

Figure 4:
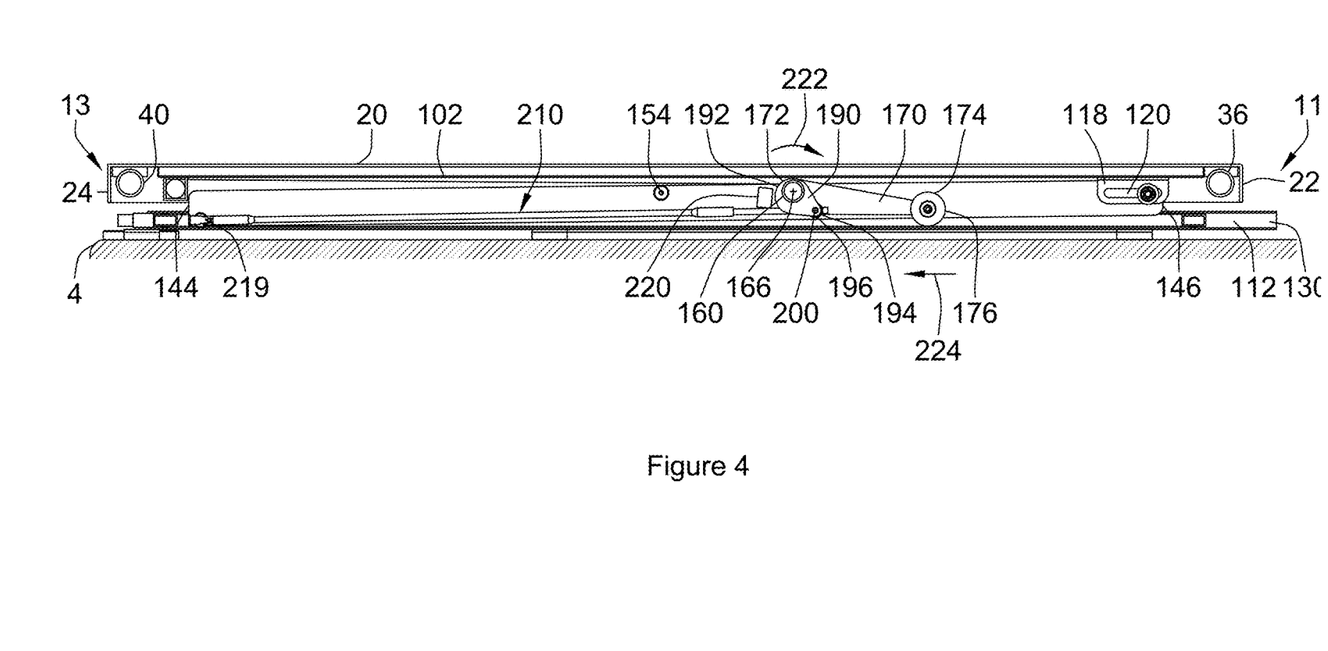
FIG. 4 is a side cross-sectional view of the apparatus of FIG. 1 at a first or lowered position as taken along the plane 4-4.

Referring now to FIGS. 2, 4 and 5, the lift 100 includes a platform 102 thereon, have a top and bottom, 104 and 106, respectively, extending between front and rear ends, 108 and 110, respectively, and between first and second sides, 112 and 114, respectively, sized such that the top 104 may be received by the bottom 46 of the central platform 20 between the first and second sides 26 and 28 and between the front and rear elongate tubular members 36 and 40. The platform 102 may have raised edges extending perpendicular to the surface at the top 104 from each end, 108 and 110, and from each side, 112 and 114, as illustrated.

An elongate end bracket 116 extends from the bottom 106 between the first and second sides 112 and 114, proximate to the rear end 110, and a pair of spaced apart slotted brackets 118 extend from the bottom 106 proximate to the first and second sides 112 and 114 and proximate to the front end 108. Each slotted bracket 118 includes a slot 120, spaced apart and parallel to the bottom 106, the purpose of which will be further described below.

A rectangular bottom frame 130, sized to fit within the bed 4, comprises a pair of spaced apart side portions 132 and a pair of spaced apart end portions 134. The side portions 132 are spaced apart a distance to fit between the wheel arches (not shown) within the bed 4, corresponding with the platform 102, and include an upright slotted bracket 136 proximate to the front 11, each bracket including a slot 138 spaced apart and parallel to the side portion 132, the purpose of which will be further described below. The location of the slotted brackets 136 corresponds with the location of the slotted brackets 118 on the platform 102. The end portions 134 are spaced apart such that one end portion 134 is proximate to the front 11 and one end portion 134 is proximate to the rear 13.

The platform 102 may be stabilized in an orientation parallel to the bed 4 of the pickup truck 8 by a pair of spaced apart first and second scissor arms, 140 and 142, respectively, extending between the platform 102 and the bottom frame 130. Each first scissor arm 140, extending from a pivot end 144 to a sliding end 146, is pivotably mounted to a side portion 132 of the bottom frame 130 proximate to the pivot end 144 at a pivot 148 proximate to the rear 13 and extends to the sliding end 146 slidably mounted to a slotted bracket 118 on the platform 102 proximate to the front 11. Each second scissor arm 142, extending from a pivot end 150 to a sliding end 152, is pivotably mounted proximate to the pivot end 150 on the end bracket 116 on the platform 102 proximate to the rear 13 extending to the sliding end 152 slidably mounted to a slotted bracket 136 on the bottom frame 130 proximate to the front 11. The sliding ends 146 and 152 include a slider or roller thereon mounted within the slots 120 and 138, respectively, to permit the sliding ends 146 and 152 to move longitudinally parallel to the bed 4 as the platform 102 is raised or lowered. Each first and second scissor arm 140 and 142 have substantially the same length and are pivotably connected to each other at a middle portion 154 thereof. The first and second scissor arms 140 and 142 serve to maintain the platform 102 parallel to the bed 4 of the truck 8 as the lift 100 is moved up and down.

Figure 6:
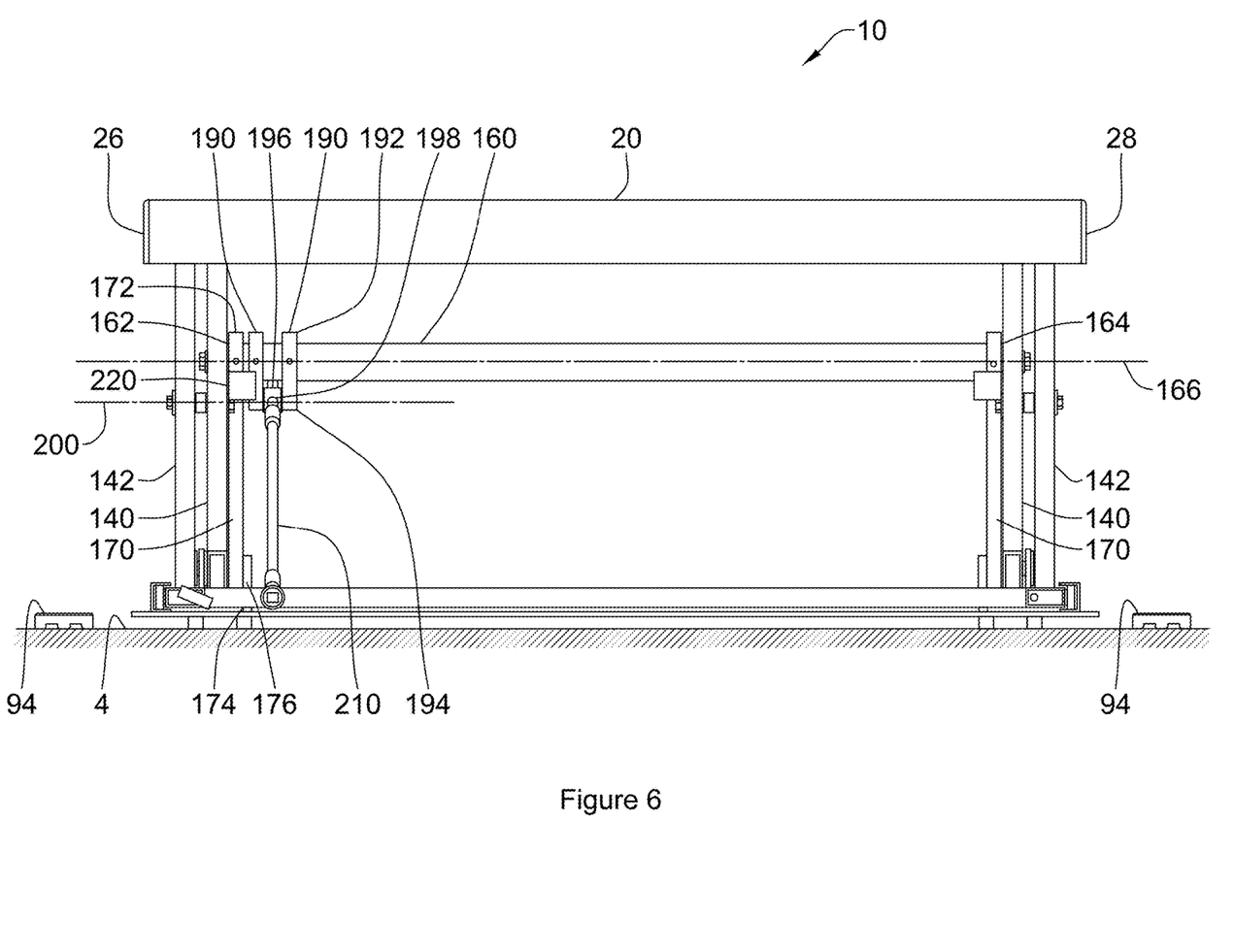
FIG. 6 is an end view of the apparatus of FIG. 1 at the second or raised position.

As best seen on FIG. 6, the lift 100 includes a shaft 160 extending between first and second ends, 162 and 164, respectively, and having a shaft axis 166 parallel to the bed 4. Each end, 162 and 164, is rotatably mounted to an inside surface of a second scissor arm 142, at a location between the middle portion 154 and the sliding end 146, rotatable about the shaft axis 166. A pair of spaced apart lift arms 170, extending between a pivot end 172 and a free end 174, are mounted proximate to the pivot end 172 proximate to each end 162 and 164 of the shaft 160. As best seen in FIGS. 4 and 5, the pivot end 172 of the lift arm 170 is mounted at an off-centre location, the purpose of which will be described below. A wheel 176 is rotatably mounted to the free end 174 of the lift arm. As best seen on FIG. 2, a rectangular track 180, comprising spaced apart elongate planar members 182, is mounted to the bed 4 with the planar members 182 positioned to receive the wheels 176 of the lift arms 170.

At least one crank arm 190, extending between a pivot end 192 and a crank end 194, is mounted at the first end 162 of the shaft 160 proximate to the lift arm 170. As illustrated in FIG. 6, the crank arm 190 may comprise two portions, although it will be appreciated that it may comprise one portion, as well. A block 196, including a threaded bore 198 therethrough is rotatably mounted proximate to the crank end 194 having leveller axis 200. The leveller axis 200 is spaced apart from and parallel to the shaft axis 166. A stopper 220 extends from the inside surface of the second scissor arm 142 proximate to the crank arm 190 and is positioned to engage upon the proximate lift arm 170 when in the second raised position, as illustrated in FIG. 5. The stopper 220 may comprise a block or angle iron, as is commonly known.

Referring to FIGS. 2, 4 and 5, an actuator 210, extending between a drive end 212 proximate to the rear 13 and a threaded end 214 engaged within the threaded bore 198 of the block 196, comprises a coupling shaft 216 at the drive end 212 and a threaded rod 218 extending through the threaded bore 198, with a universal joint 219, or other rotatable coupling device as is commonly known, therebetween. The coupling shaft 216 is mounted to the end portion 134 proximate to the rear 13 at a location to correspond with the crank arm 190.

To utilize the apparatus 10, the track 180 is positioned on the bed 4 within the box 6 of the truck 8 and may be fastened thereon by any known means. The mounting blocks 94 are secured to the bed 4 by any known means at a location proximate to the rear 13 to correspond with the rotatable vertical supports 76 when in the final installed position. The lift 100 is positioned within the box 6 in the lowered position, as illustrated in FIG. 4, such that the wheels 176 on the lift arms 170 engage upon the track 180. The central platform 20 is then positioned on the lift 100 such that the platform 102 engages upon the bottom 46 of the central platform 20, as outlined above.

A rotatable drive device (not shown) is engaged within the coupling shaft 216 of the actuator 210 and torque is applied thereon to rotate the actuator 210 thereby rotating the threaded rod 218 within the threaded bore 198 of the block 196 and drawing the crank end 194 of the crank arm 190 towards the rear 13, rotating the crank arm 190, lift arm 170 and shaft 160 about the shaft axis 166 in a direction indicated at 222 on FIG. 4. As the lift arms 170 rotate, the wheels 176 roll in a direction indicated at 224, and the first and second scissor arms 140 and 142 lift the central platform 20 to the raised position as illustrated in FIG. 5. As the shaft axis 166 is off-center on the lift arm 170, when the lift arm 170 is substantially vertical, as illustrated in FIG. 5, the lift arm 170 proximate to the crank arm 190 will engage upon the stopper 220, thereby limiting further movement.

When the lift 100 is in the raised position, the first and second platform extensions 50 and 98 may be engaged with the central platform 20 by inserting the front and rear support arms 62 and 64 within the passages 38 and 42 until the first and second platform extensions 50 and 98 form a continuous planar horizontal surface with the central platform 20. The locking blocks 74 may then be secured to the box 6 within the stake pockets, as is commonly known. The rotatable vertical supports 76 are lowered from the first and second platform extensions 50 and 98 in a direction indicated at 224 on FIG. 5 and extended to engage with the mounting blocks 94 in a direction indicated at 226. The clamp 88 is then tightened to maintain the length of the rotatable vertical supports 76.

When the rotatable vertical supports 76 have been secured within the mounting blocks 94 as set out above, the lift 100 may be lowered by applying torque to the actuator 210 in an opposite direction. The central platform 20 is secured to the first and second platform extensions 50 and 98, which are secured to the box 6 of the truck 8 and the lift 100 may be removed to allow for cargo to be carried within the box 6 below the central platform 20 while additional cargo may be carried thereon the apparatus 10.

While specific embodiments of the invention have been described and illustrated, such embodiments should be considered illustrative of the invention only and not as limiting the invention as construed in accordance with the accompanying claims.

What is claimed is:

1. An apparatus for transporting cargo within the box of a truck, the apparatus comprising:
    a central platform, extending between first and second sides, said central platform sized to be located between wheel wells of a box of a truck;
    a lift, operable to move said central platform between a first position parallel to and proximate to a bottom horizontal surface of a bed of said box of said truck and a second position parallel to and vertically spaced above said first position, wherein said lift comprises:
    a scissor lift having first and second crossed interlinked scissor members located adjacent to each of said first and second sides of said central platform;
    a shaft, extending between said first and second crossed interlinked scissor members and rotatably secured to said first and second crossed interlinked scissor members, rotatable about a shaft axis;
    at least one lift arm mounted on said shaft, operable to extend said first and second crossed interlinked scissor members; and
    a threaded rod operable to rotate said at least one lift arm about said shaft axis, said threaded rod extending between a rear cross member of said lift and a threaded body, said threaded body secured to a crank arm, rotatable about a threaded body axis and operable to engage with said threaded rod; and
    first and second platform extensions, each of said first and second platform extensions operably engageable with said first or second side of said central platform so as to form a continuous planar surface therewith at said second position.

2. The apparatus of claim 1 wherein each of said first and second platform extensions includes at least one support arm extending perpendicularly therefrom, said at least one support arm sized to be received within a corresponding mounting hole within said first or second side of said central platform.

3. The apparatus of claim 2 wherein said at least one support arm comprises two support arms.

4. The apparatus of claim 1 wherein each of said first and second platform extensions includes at least one vertical support, rotatably supported from a bottom of said first and second platform extensions into engagement with said bed of said truck.

5. The apparatus of claim 4 further comprises at least one mounting block secured to said bed of said truck.

6. The apparatus of claim 1 wherein said at least one lift arm includes a wheel at a distal end thereof.

7. The apparatus of claim 6 wherein said wheel engages upon a track proximate to said bed of said truck.

8. A method for transporting cargo within a truck comprising:
    providing a central platform, extending between first and second sides, said central platform sized to be located between wheel wells of a box of a truck;
    providing a lift, operable to move said central platform between a first position parallel to and proximate to a bottom horizontal surface of a bed of said box of said truck and a second position parallel to and vertically spaced above said first position, wherein said lift comprises:
    a scissor lift having first and second crossed interlinked scissor members located adjacent to each of said first and second sides of said central platform;
    a shaft, extending between said first and second crossed interlinked scissor members and rotatably secured to said first and second crossed interlinked scissor members, rotatable about a shaft axis;
    at least one lift arm mounted on said shaft, operable to extend said first and second crossed interlinked scissor members; and
    a threaded rod operable to rotate said at least one lift arm about said shaft axis, said threaded rod extending between a rear cross member of said lift and a threaded body, said threaded body secured to a crank arm, rotatable about a threaded body axis and operable to engage with said threaded rod;
    providing first and second platform extensions, each of said first and second platform extensions operably engageable with said first or second side of said central platform so as to form a continuous planar surface therewith at said second position;
    actuating said lift with a torque device, raising said central platform to said second position;
    engaging said first and second platform extensions with said central platform, forming said continuous planar surface therewith;
    rotating a vertical support from each of said first and second platform extensions and engaging said vertical supports with corresponding mounting blocks, said mounting blocks secured to said bed of said truck;
    positioning the cargo on said continuous planar surface.

* * * * *